(12) United States Patent
Dinh et al.

(10) Patent No.: US 11,038,786 B2
(45) Date of Patent: Jun. 15, 2021

(54) STREAMING AND EVENT MANAGEMENT INFRASTRUCTURE PERFORMANCE PREDICTION

(71) Applicant: Dell Products L.P., Round Rock, TX (US)

(72) Inventors: Hung Dinh, Austin, TX (US); Sabu K. Syed, Austin, TX (US); Bijan Kumar Mohanty, Austin, TX (US); Satish Ranjan Das, Round Rock, TX (US); Krishna Mohan Akkinapalli, Austin, TX (US); Craig J. Van Der Bogart, Cedar Park, TX (US); Reddeppa Kollu, Leander, TX (US); Kannappan Ramu, Frisco, TX (US)

(73) Assignee: Dell Products LP., Round Rock, TX (US)

( * ) Notice: Subject to any disclaimer, the term of this patent is extended or adjusted under 35 U.S.C. 154(b) by 0 days.

(21) Appl. No.: 16/670,698

(22) Filed: Oct. 31, 2019

(65) Prior Publication Data
US 2021/0135966 A1 May 6, 2021

(51) Int. Cl.
G06N 20/20 (2019.01)
H04L 12/26 (2006.01)
H04L 29/06 (2006.01)

(52) U.S. Cl.
CPC ......... *H04L 43/0823* (2013.01); *G06N 20/20* (2019.01); *H04L 43/0817* (2013.01); *H04L 65/80* (2013.01)

(58) Field of Classification Search
None
See application file for complete search history.

(56) References Cited

U.S. PATENT DOCUMENTS

| | | | | |
|---|---|---|---|---|
| 7,380,005 B1* | 5/2008 | Li | ........................... | G06F 9/546 709/226 |
| 9,800,466 B1* | 10/2017 | Rangole | ............. | G06F 11/3452 |
| 2003/0135382 A1* | 7/2003 | Marejka | ............. | G06F 11/3495 709/232 |
| 2004/0071095 A1* | 4/2004 | Raisanen | ................ | H04L 43/00 370/252 |
| 2005/0049901 A1* | 3/2005 | Diao | ................... | G06F 11/3447 703/2 |
| 2013/0305022 A1* | 11/2013 | Eisen | .................... | G06F 9/3861 712/214 |

(Continued)

OTHER PUBLICATIONS

Tutorials Point, "Apache Kafka—Cluster Architecture," https://www.tutorialspoint.com/apache_kafka/apache_kafka_cluster_architecture.htm, 2019, 2 pages.

(Continued)

*Primary Examiner* — James A Edwards
(74) *Attorney, Agent, or Firm* — Ryan, Mason & Lewis, LLP

(57) ABSTRACT

A method includes receiving a plurality of performance metrics from a data streaming infrastructure. The data streaming infrastructure comprises one or more message producers, one or more message brokers and one or more message consumers. In the method, the plurality of performance metrics are analyzed in a machine learning model, and one or more performance issues with the data streaming infrastructure are predicted based on the analyzing.

19 Claims, 9 Drawing Sheets

(56) References Cited

U.S. PATENT DOCUMENTS

| | | | | |
|---|---|---|---|---|
| 2014/0180889 | A1* | 6/2014 | Rooney | G06Q 40/04 705/37 |
| 2017/0132068 | A1* | 5/2017 | Parra | H04L 41/145 |
| 2017/0269854 | A1* | 9/2017 | Dimnaku | G06F 3/0613 |
| 2017/0310628 | A1* | 10/2017 | Norwood | H04L 51/18 |
| 2019/0068622 | A1* | 2/2019 | Lin | G06F 21/552 |
| 2020/0210466 | A1* | 7/2020 | Yin | G06F 16/313 |

OTHER PUBLICATIONS

Tutorials Point, "Apache Kafka—Fundamentals," https://www.tutorialspoint.com/apache_kafka/apache_kafka_fundamentals.htm, 2019, 3 pages.

Tutorials Point, "Apache Kafka—Introduction," https://www.tutorialspoint.com/apache_kafka/apache_kafka_introduction.htm, 2019, 3 pages.

Tutorials Point, "Apache Kafka—WorkFlow," https://www.tutorialspoint.com/apache_kafka/apache_kafka_workflow.htm, 2019, 3 pages.

Science Direct, "Cache Hit Rate," https://www.sciencedirect.com/topics/computer-science/cache-hit-rate, 2019, p. 1, 26 pages.

IBM Event Streams, "Consuming Messages," https://ibm.github.io/event-streams/about/consuming-messages/, 2019, 5 pages.

H2O, "Open Source, Distributed Machine Learning for Everyone," https://www.h2o.ai/products/h2o/, 2019, 9 pages.

D. Mytton, "How to Monitor Zookeeper," Server Density Blog, https://blog.serverdensity.com/how-to-monitor-zookeeper/, Jan. 12, 2016, 9 pages.

Sematext Group, "Kafka Consumer Lag Monitoring," https://sematext.com/blog/kafka-consumer-lag-offsets-monitoring/, Jun. 7, 2016, 4 pages.

Wikipedia, "Network Delay," Retrieved from "https://en.wikipedia.org/w/index.php?title=Network_delay&oldid=917999718", Sep. 26, 2019, 1 page.

Cloudurable Tech, "What is Apache Kafka?" cloudurable.com/blog/what-is-kafka/index.html, May 10, 2017, 15 pages.

IBM, "What is Batch Processing?" https://www.ibm.com/support/knowledgecenter/zosbasics/com.ibm.zos.zconcepts/zconc_whatisbatch.htm, 2019, 3 pages.

M. Rouse, "What is Latency," WhatIs.com, https://whatis.techtarget.com/definition/latency, Sep. 2016, 6 pages.

E. Vinka, "What is Zoozeeper and Why Is It Needed for Apache Kafka?" https://www.cloudkarafka.com/blog/2018-07-04-cloudkarafka_what_is_zookeeper.html, Jul. 4, 2018, 5 pages.

Tutorials Point, "Zookeeper—Fundamentals," https://www.tutorialspoint.com/zookeeper/zookeeper_fundamentals.htm, 2019, 4 pages.

Tutorials Point, "Zookeeper—Overview," https://www.tutorialspoint.com/zookeeper/zookeeper_overview.htm, 2019, 3 pages.

Tutorials Point, "Zookeeper—Workflow," https://www.tutorialspoint.com/zookeeper/zookeeper_workflow.htm, 2019, 3 pages.

Tutorials Point, "Zookeeper Tutorial," https://www.tutorialspoint.com/zookeeper/index.htm, 2019, 2 pages.

Apache Software, "Zookeeper," https://zookeeper.apache.org/doc/r3.5.0-alpha/zookeeperOver.html, Dec. 14, 2018, 11 pages.

* cited by examiner

```
RandomForestRegressor(bootstrap=True, criterion=    , max_depth=None,
    max_features=    , max_leaf_nodes=None,
    min_samples_leaf=1, min_samples_split=2,
    min_weight_fraction_leaf=0.0,
    n_estimators=10, n_jobs=1, oob_score=False, random_state=None,
    verbose=0, warm_start=False)
```

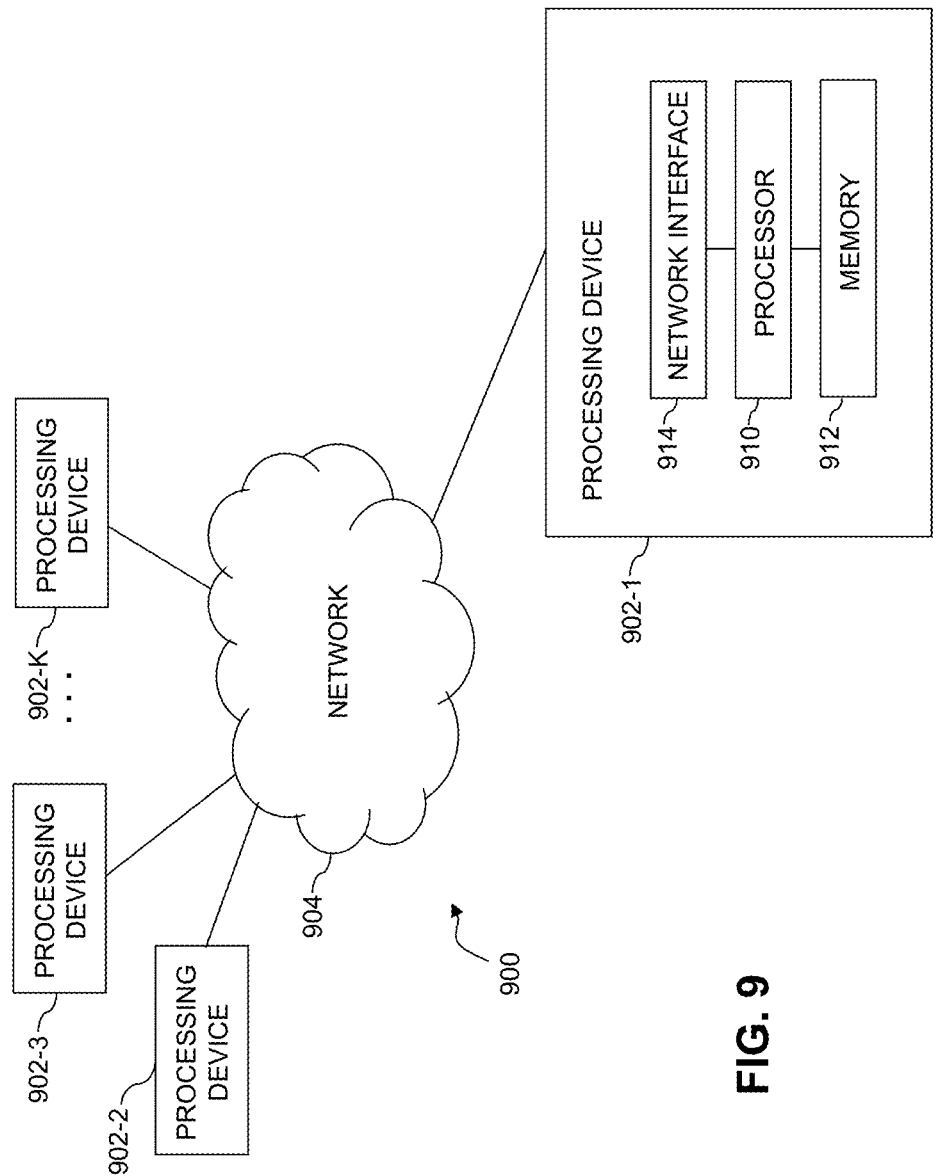

STREAMING AND EVENT MANAGEMENT INFRASTRUCTURE PERFORMANCE PREDICTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to computing environments, and more particularly to techniques for predicting latency in integrated data streaming and event management infrastructures.

BACKGROUND

Message Oriented Middleware (MOM) is a form of middleware which is capable of facilitating data streaming, enterprise event management and transportation of messages from one component to another, and is critical to the operations of various enterprises. For example, enterprises may include applications using MOM infrastructures to process millions of messages each day.

Current systems simultaneously rely on different MOM products for managing data streaming, events and messaging, which are executed on a distributed architecture incorporating various servers. When there are multiple integrated MOM platforms handling data transfer for an enterprise, performance management for the integrated platforms, and more specifically, preventing latency has proved difficult.

Latency in connection with data transfer causes negative user experiences, which adversely affect the business of an enterprise. Accordingly, there is a need for techniques to address and prevent latency in infrastructures relying on multiple MOM platforms from different sources.

SUMMARY

Illustrative embodiments correspond to techniques for creating machine learning based models to predict latency related anomalies in streaming and event management platforms, and to avoid outages before they occur. Embodiments advantageously generate and apply machine learning models based on data from a variety of sources in a data streaming infrastructure to evaluate and predict system performance.

In one embodiment, a method comprises receiving a plurality of performance metrics from a data streaming infrastructure. The data streaming infrastructure comprises one or more message producers, one or more message brokers and one or more message consumers. In the method, the plurality of performance metrics are analyzed in a machine learning model, and one or more performance issues with the data streaming infrastructure are predicted based on the analyzing.

These and other illustrative embodiments include, without limitation, methods, apparatus, networks, systems and processor-readable storage media.

BRIEF DESCRIPTION OF THE DRAWINGS

FIG. 3 depicts example pseudocode for using a random forest model to predict latency in an illustrative embodiment.

FIG. 5 depicts example pseudocode for leveraging gradient descent and cost function to predict latency in an illustrative embodiment.

FIGS. 8 and 9 show examples of processing platforms that may be utilized to implement at least a portion of an information processing system in illustrative embodiments.

DETAILED DESCRIPTION

Figure 1:
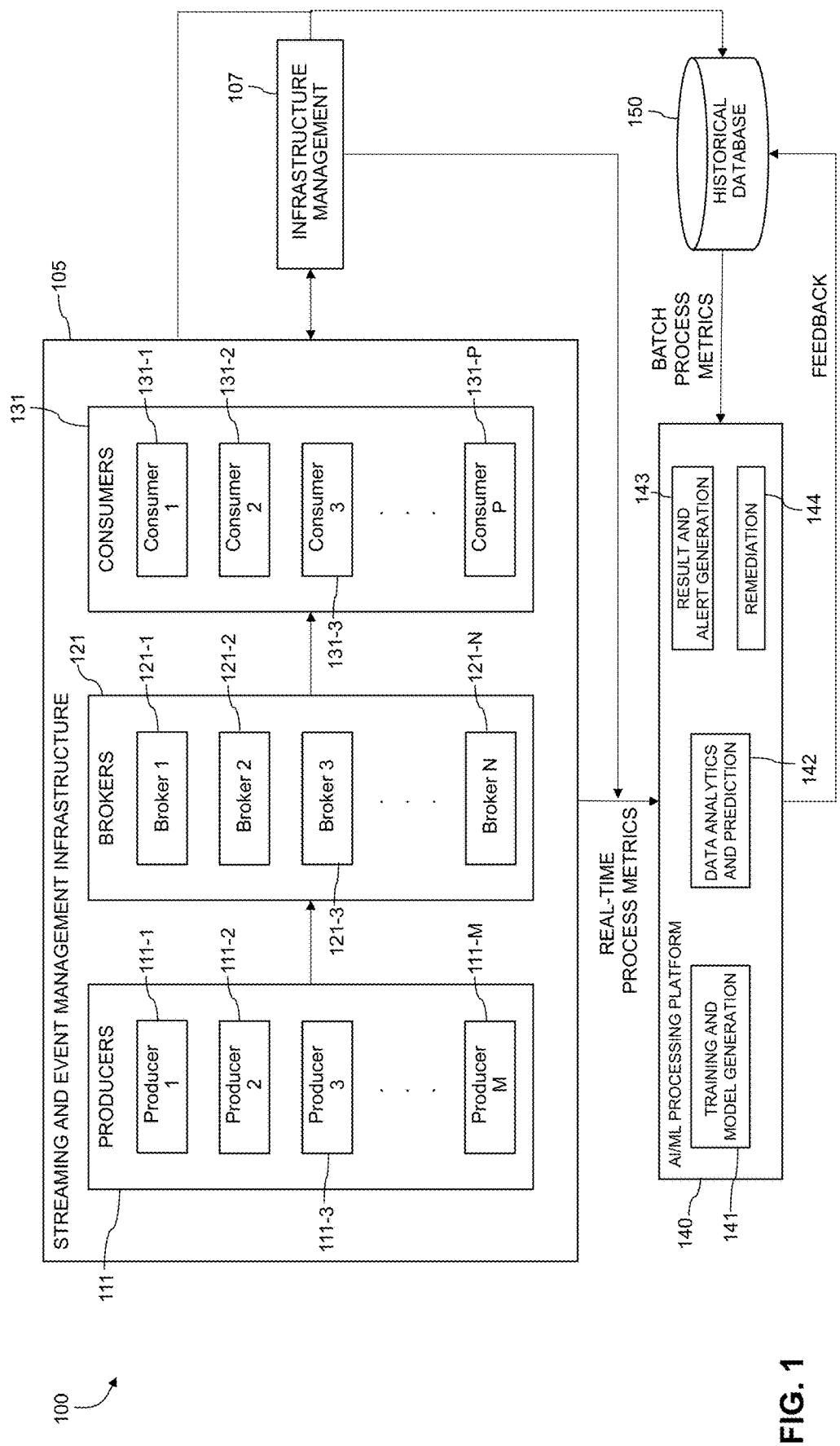
FIG. 1 is a block diagram of an information processing system comprising an artificial intelligence/machine learning (AWL) architecture configured for predicting performance of a streaming and event management infrastructure in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "latency" refers to the amount of time it takes for data to travel from one communication point to another communication point. Latency can be measured in multiples or fractions of seconds. Latency can be reported in terms of, for example, maximum latency and average latency. Factors increasing latency can include, but are not necessarily limited to, processing delays, routing delays, increased network volume and congestion, increased data size, storage device access delays, mismatches in data speed between the processors and input/output (IO) devices, inadequate data buffers, decreased hardware performance, and increased server load. Latency issues can be perceived as lags between an action and a response to the action, such as, for example, video and audio lags for streaming video and audio, and/or difficulties with control in on-line gaming environments, for example, when a player is lagging behind real-time events in a game.

FIG. 1 shows an information processing system 100 configured in accordance with an illustrative embodiment. The information processing system 100 implements an artificial intelligence/machine learning (AI/ML) processing platform 140 configured for predicting performance of a streaming and event management infrastructure 105. The streaming and event management infrastructure 105 comprises a plurality of message producers 111-1, 111-2, 111-3, . . . 111-M (collectively "message producers 111"), a plurality of message brokers 121-1, 121-2, 121-3, . . . 121-N (collectively "message brokers 121") and a plurality of message consumers 131-1, 131-2, 131-3, . . . 131-P (collectively "message brokers 131"). The streaming and event management infrastructure 105 streams data in connection with, for example, video and audio streaming for entertainment and enterprise applications including, but not necessarily limited to, online gaming, television and movies, online education, seminars, conferences and presentations. The variables M, N and P and other similar index variables herein such as K and L are assumed to be arbitrary positive integers greater than or equal to two.

In a hybrid arrangement of different MOM platforms and networks, the message producers 111, message brokers 121 and message consumers 131 are associated with a plurality of MOM platforms and networks, which integrate with each other to form the streaming and event management infrastructure 105. In other words, the streaming and event management infrastructure 105 utilizes multiple MOM platforms and networks in an integrated infrastructure structure. For example, some of the message producers 111 can be connected to one MOM platform, while other message producers 111 are connected to another different MOM platform. Similarly, some of the message consumers 131 can be connected to one MOM platform, while other message consumers 131 are connected to another different MOM platform. In addition, some of the message brokers 121 may be running on one MOM platform, while other message brokers 121 are running on another different MOM platform. Further integration can occur with message producers 111, brokers 121 and consumers 131 corresponding to different MOM platforms from each other.

The MOM platforms include the plurality of brokers 121 to permit data exchange between distributed applications by sending and receiving messages. For example, an application with data to distribute (e.g., message producer) sends a message with the data to another connected application (e.g., message consumer) configured to receive the message. The message is sent via one or more brokers 121 to the connected application.

The applications comprise, for example: (i) platforms for business process automation, which enable communication between different software systems used in an enterprise; (ii) platforms to provide programming language interoperability; (iii) platforms to provide support for web applications through, for example, servlets, struts or Java® Server Pages (JSPs); (iv) platforms for programming using certain programming languages (e.g., C, C++) to create, for example, computer applications, firmware, verification software, test code and/or simulators for various applications and hardware products; (v) platforms to provide service-oriented architecture (SOA) services including, but not necessarily limited to, distributed application components incorporating discovery, access control, data mapping and security features; and (vi) platforms to provide microservices including, but not necessarily limited to, collections of loosely coupled, fine-grained and parallelized services implementing light-weight protocols.

The applications may be operatively coupled (e.g., via one or more communication networks) to one or more backend services. In accordance with the present disclosure, the one or more backend services can include, for example, database management systems, such as database servers for storing and retrieving data as requested by applications, third-party customer relationship management (CRM) applications providing enterprises with an interface for case and task management, and cloud environments for enterprise solutions including, for example, information management, compliance, and business-to-business (B2B) integration.

Message producers 111 push data to message brokers 121, which is then sent to message consumers 131. Message brokers 121 are intermediaries that translate messages from a messaging protocol of a message producer 111 to a messaging protocol of a message consumer 131. Message brokers 121 are elements in a MOM platform. The MOM platforms including the plurality of brokers 121 include a plurality of servers, which include architectures with, for example, application programming interfaces (APIs) and administrative tools to route and deliver messages. In an embodiment, the MOM platforms in the hybrid arrangement of different MOM platforms and networks require different functionality or implementations of connectivity/messaging protocols, such as, for example, machine-to-machine (M2M) messaging protocols. In a non-limiting embodiment, M2M protocols can include, but are not necessarily limited to, Message Queuing Telemetry Transport (MQTT), constrained application protocol (CoAP), and/or OMA light-weight machine to machine (LWM2M).

The MOM platforms respectively correspond to different sources, which run different software and have different capabilities. Some non-limiting examples of MOM platforms are IBM® MQ (International Business Machines Corporation, Armonk, N.Y.), RabbitMQ® (Pivotal Software, Inc., San Francisco, Calif.), Apache™ ActiveMQ® and Apache™ Kafka® (Apache Software Foundation, Wakefield, Mass.). MOM platform servers can be, for example, closed and proprietary, while one or more other MOM platform servers can be, for example, open source.

An infrastructure management component 107 is operatively coupled to and/or an element of the streaming and event management infrastructure 105. The infrastructure management component 107 is a distributed configuration service, a synchronization service, and a naming registry for the streaming and event management infrastructure 105 comprising components located on different networked computers. The infrastructure management component 107 coordinates nodes of the streaming and event management infrastructure 105, and maintains and synchronizes shared data between the nodes of the streaming and event management infrastructure 105. Some of the functions of the infrastructure management component 107 include (i) a naming service, which identifies the nodes of the streaming and event management infrastructure 105 by name; (ii) configuration management, which provides current configuration information of and to the nodes of the streaming and event management infrastructure 105; (iii) provision of status information of the nodes of the streaming and event management infrastructure 105; and (iv) highly available data. A non-limiting example of the infrastructure management component 107 is Apache™ Zookeeper.

The information processing system 100 includes an AI/ML processing platform 140 configured to receive a plurality of performance metrics from the streaming and event management infrastructure 105 and the infrastructure management component 107. The AI/ML processing platform 140 includes a training and model generation component 141, a data analytics and prediction component 142, a result and alert generation component 143 and a remediation component 144. The data analytics and prediction component 142 analyzes the plurality of performance metrics using one or more machine learning models, and predicts one or more performance issues with the data streaming infrastructure based on the analyzing. According to one or more embodiments, the plurality of performance metrics are received from the streaming and event management infrastructure 105 and/or the infrastructure management component 107 in real-time (e.g., real-time process metrics) upon monitoring of the message producers 111, the message brokers 121 and/or the message consumers 131 to obtain the plurality of performance metrics.

The plurality of performance metrics include, but are not necessarily limited to, response rates, request rates, request latency rates, outgoing byte rates and average IO wait time of the message producers. For example, the response rates correspond to how quickly the message producers 111 respond to requests for data from brokers 121 and/or consumers 131, and the request rates correspond to how quickly the message producers 111 are able to process data requests. The request latency rates (e.g., request latency average) corresponds to the amount of time (e.g., average time) it takes for a message producer 111 to respond to a data request, and average IO wait time corresponds to how long before inputs (e.g., data requests) are received by the message producers 111 and how long before outputs (e.g., requested data) are received by the brokers 121 and/or consumers 131 from the message producers 111.

The plurality of performance metrics also include, but are not necessarily limited to, a page cache reads ratio, disk usage, central processing unit (CPU) usage, network bytes sent and network bytes received of the message brokers 121. For example, the cache reads ratio provides data on the efficiency of a cache associated with one or more message brokers 121. For example, the number of cache hits divided by a total number of memory requests over a given time interval, which can be expressed as a percentage, measures reads (and/or writes) to provide a hit rate for reads (or a hit rate for writes) of a cache as a function of memory requests. Disk usage and CPU usage provide data on the volume of usage of disks and CPUs associated with the brokers 121, and network bytes sent and network bytes received provide data on the number of bytes received by and/or sent from the message brokers 121 over a given time interval to gauge whether the brokers are operating properly and/or how the brokers 121 are operating with respect to each other.

The plurality of performance metrics further include, but are not necessarily limited to, a delay between reading and writing of a message, a message consumption rate and a message retrieval rate of the message consumers 131. The delay between reading and writing of a message provides data on time lag between a consumer 131 reading a received message and writing the message. Data may include average and maximum lag. Message consumption rate provides data including a number of bytes and/or a number of messages consumed by one or more message consumers 131 over a given time interval (e.g., bytes per second, messages per second). Message retrieval rate includes data corresponding to how quickly consumers 131 retrieve messages from brokers 121. Similar to message consumption rate, message retrieval can be expressed in terms of a number of bytes and/or a number of messages retrieved by one or more message consumers 131 over a given time interval (e.g., bytes per second, messages per second).

A plurality of performance metrics may also be generated by the infrastructure management component 107 and include, but are not necessarily limited to, an average latency of one or more servers, a number of queued requests in the one or more servers, a number of follower servers, a number of pending synchronizations for the follower servers, and/or a number of open files. The average latency can be of a plurality of servers corresponding to message producers 111, message brokers and/or message consumers 131. Maximum latency values of one or more of the plurality of servers can also be identified and sent to the AI/ML processing platform 140. The number of queued requests corresponds, for example, to a number of requests for data that may be waiting to be acted on at a given time in one or more servers of the infrastructure 105.

According to an embodiment, write requests from, for example, message consumers 131, are forwarded to a server in the infrastructure 105 referred to as the leader. The remaining servers are referred to as followers, which are synced with the leader. Consumers 131 connect to the followers and send read and write requests to the followers, which forward the requests to the leader. The followers receive message proposals from the leader and agree upon message delivery to the consumers 131. The plurality of performance metrics can include a number of the follower servers, and/or a number of pending synchronizations of the follower servers with the leader server. The infrastructure management component 107 also generates data including the number and descriptors of open files.

As noted above and described further herein below, these performance metrics are provided in real-time to the AI/ML processing platform 140 for analysis so that the data analytics and prediction component 142 can use machine learning algorithms to generate predictions based on the performance metrics of performance issues of nodes in the streaming and event management infrastructure 105. For example, one or more of the producers 111, brokers 121, consumers 131 and/or servers or other components associated with the producers 111, brokers 121 and/or consumers 131 may have latencies exceeding a threshold, which require remedial action.

According to an embodiment, the plurality of performance metrics along with corresponding previously determined performance issues are input to a database 150 of historical data. The performance metrics and the corresponding previously determined performance issues are received from the streaming and event management infrastructure 105, the infrastructure management component 107, and as feedback from the AI/ML processing platform 140. Training datasets comprising historical performance issues of the streaming and event management infrastructure 105 and one or more performance metrics corresponding to the historical performance issues are provided to the AI/ML processing platform 140 from the historical database (e.g., batch process metrics) and used by the training and model generation component 141 to train the one or more machine learning models used in connection with generating the performance issue predictions in real-time. The training and model generation component 141 of the AI/ML processing platform 140 is trained based on historical data taken over various time periods, such as, but not necessarily limited to, one, two or six months, or one or two years. The historical database 150 is continuously updated based on feedback from the AI/ML layer 140, as well as updated performance metrics from the streaming and event management infrastructure 105 and the infrastructure management component 107.

The AI/ML processing platform 140 is configured to perform data analytics to determine trends and make predictions regarding performance issues (e.g., latency beyond certain limits) associated with nodes of the streaming and event infrastructure 105. The AI/ML processing platform 140, in particular, the data analytics and prediction component 142, uses machine learning techniques to analyze one or more of a plurality of performance metrics over a given time period to predict one or more performance issues that are deemed likely occur, so that remedial action may be taken and the performance issues (e.g., unwanted latencies) can be prevented before they occur. According to the embodiments, the machine learning techniques utilize, for example, a random forest model, a queueing network model, a time series model, a logistics regression model, a support vector machine (SVM) and/or neural networks.

For example, according to an embodiment, the AI/ML processing platform 140 is configured to perform performance issue prediction using a random forest model. According to one or more embodiments, the random forest model is used to predict latency issues associated with the streaming and event management infrastructure 105 in real-time. For example, in analyzing the performance metrics, in executing the random forest model, the AI/ML processing platform 140 identifies a plurality of latencies associated with one or more nodes of the streaming and event management infrastructure 105, and divides the plurality of latencies into a plurality of bins based on latency duration. Then, the AI/ML processing platform 140 defines a plurality of classes based on bin value, and identifies one or more bins of the plurality of bins belonging to a class of the plurality of the classes exceeding a threshold bin value.

Figure 2:
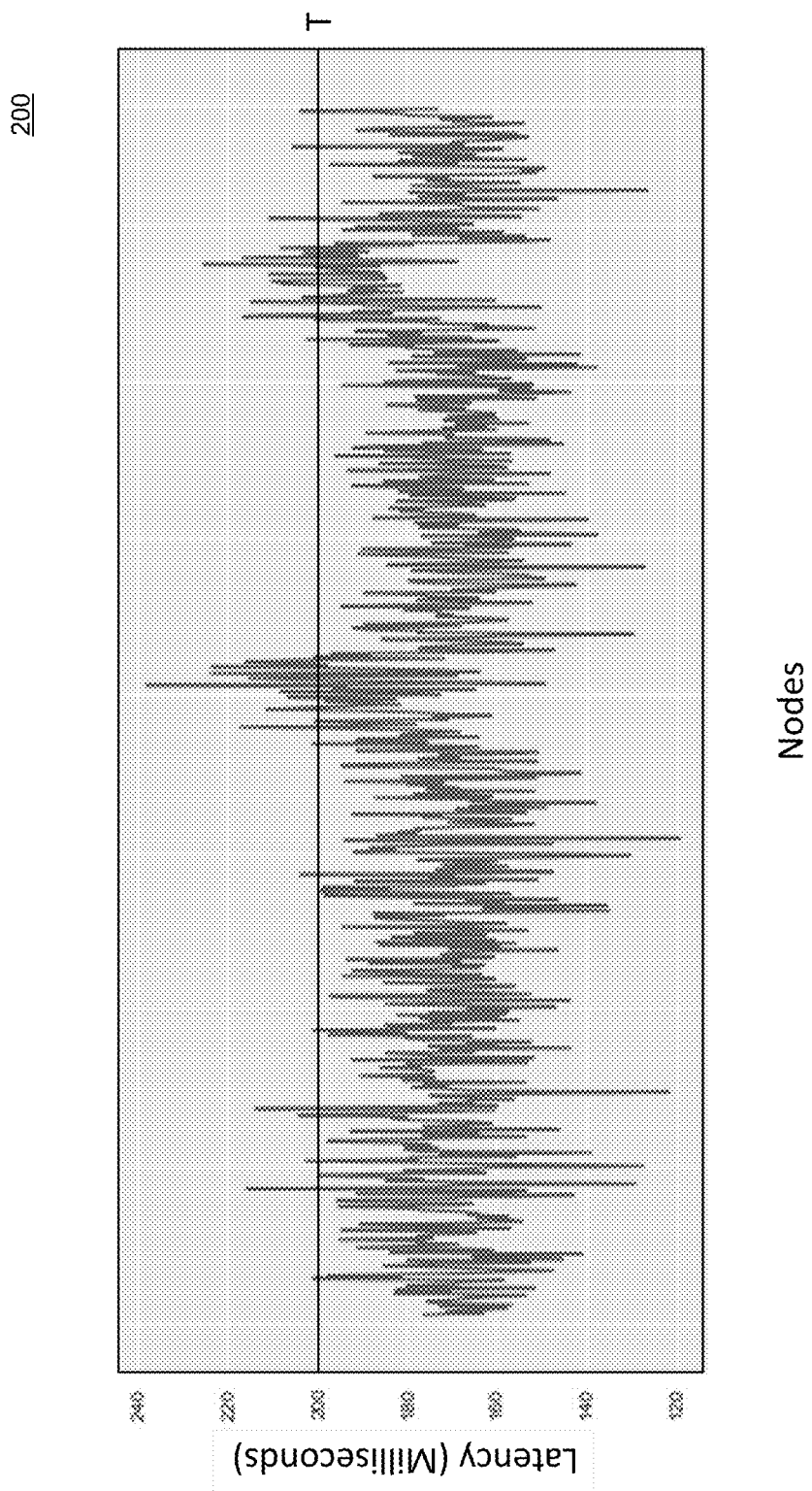
FIG. 2 is a graph illustrating latencies relative to a threshold in an illustrative embodiment.

In a non-limiting illustrative example, in applying the random forest model, the latencies are divided into bins each having a length of 50 milliseconds (e.g., 0 to 49, 50-99, 100-149, 150-199, 200-249 milliseconds, etc.) (y bins in total, where y is an integer greater than 1). Then, three classes (low latency, medium latency and high latency) are defined based on the bin value. For example, bins with latencies less than 100 ms correspond to the low latency class, bins with latencies of 100 ms-199 ms correspond to the medium latency class, and bins with latencies greater than or equal to 200 ms correspond to the high latency class. The bins belonging to the high latency class and the nodes in the infrastructure 105 corresponding to the high latency class are identified. The identified nodes are determined by the data analysis and prediction component 142 to be nodes with performance issues where remedial action is required. Referring to the graph 200 in FIG. 2, latencies of nodes relative to a threshold T of 200 ms are illustrated. The graph 200 illustrates those nodes in the high latency class (at or above the threshold T) requiring remediation. FIG. 3 depicts example pseudocode 300 for using the random forest model to predict latency. In establishing the threshold T, the training and model generation component 141 and/or a developer may allow for certain inherent or negligible latency issues to occur based on parameters not within the control of an enterprise and/or accepted delays in transmission that do not alter user experience of streaming or other data transfer services.

According to one or more embodiments, the result and alert generation component 143 generates an alert message identifying the nodes having the performance issues to one or more users or clients. The one or more users receive the alert message via a network and a user device coupled to the network. The user devices can comprise, for example, Internet of Things (IoT) devices, desktop, laptop or tablet computers, mobile telephones, or other types of processing devices capable of communicating with the AI/ML processing platform 140 over a network. Such devices are examples of what are more generally referred to herein as "processing devices." Some of these processing devices are also generally referred to herein as "computers." The user devices may also or alternately comprise virtualized computing resources, such as virtual machines (VMs), containers, etc. The user devices in some embodiments comprise respective computers associated with a particular company, organization or other enterprise. In some embodiments, the user devices are assumed to be associated with repair technicians, system administrators, information technology (IT) managers, software developers or other authorized personnel configured to access and manage the streaming and event management infrastructure 105 and/or the AI/ML processing platform 140.

The remediation component 144 identifies one or more healthy replacement nodes that do not have latencies in the high latency class which can be used as replacements for the nodes having the performance issues, and automatically substitutes the nodes having the performance issues with the replacement nodes so that the infrastructure uses the replacement nodes instead of the unhealthy nodes, thereby preventing unwanted latencies from occurring.

Figure 4:
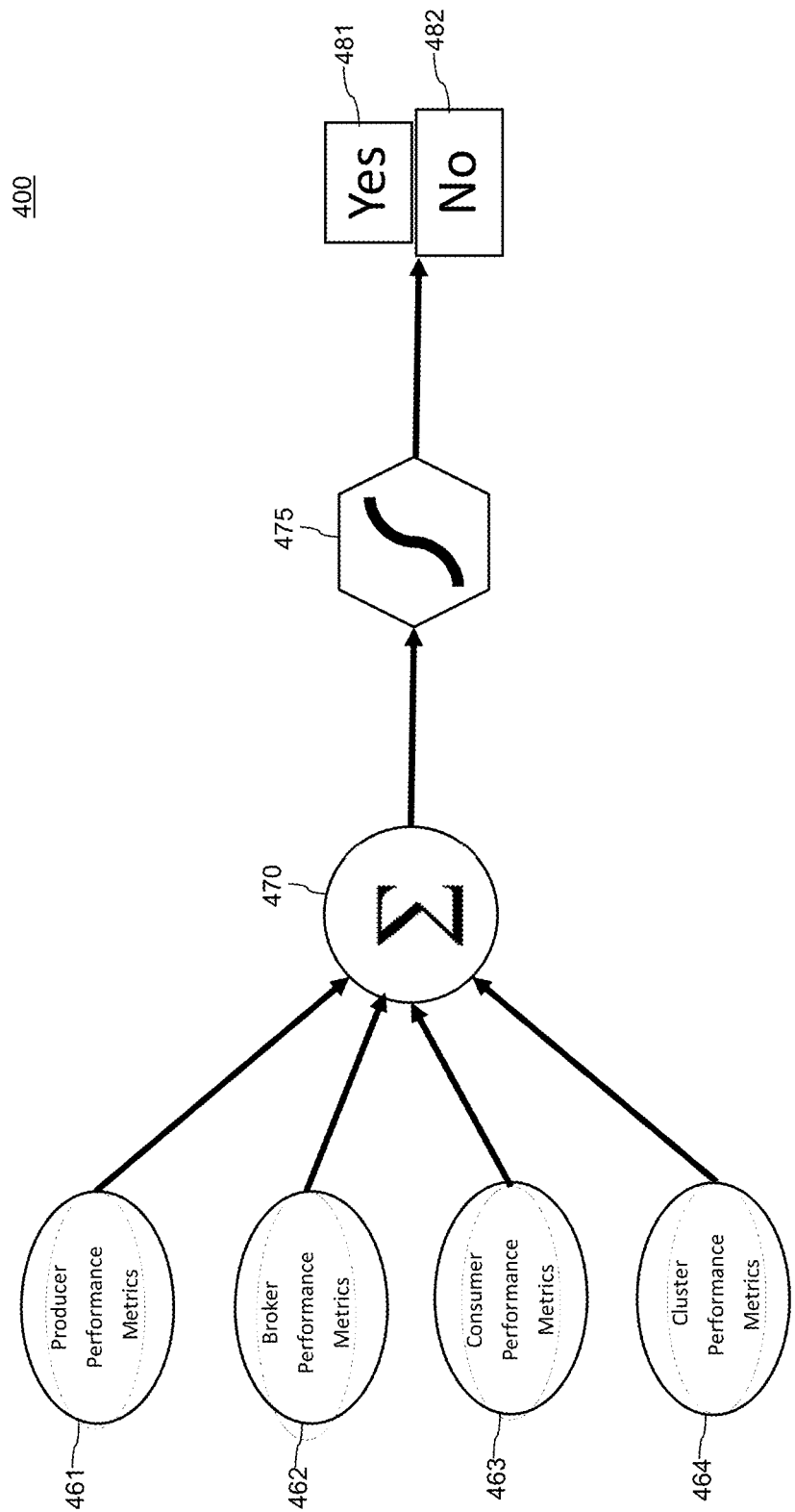
FIG. 4 is a block diagram illustrating using a logistics regression model for classification and prediction of MOM latency issues in an illustrative embodiment.
Figure 6:
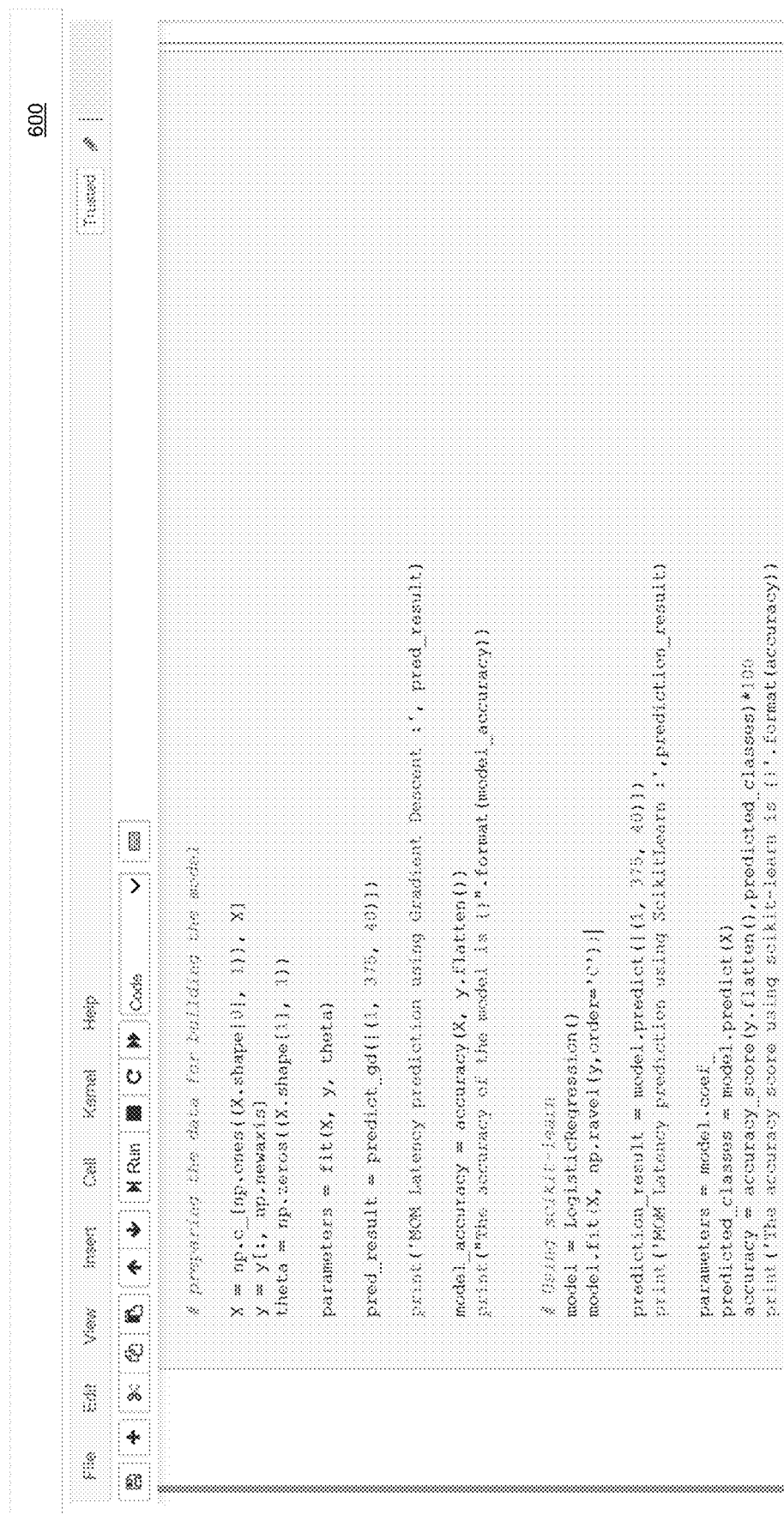
FIG. 6 depicts example pseudocode for using a logistics regression model for classification and prediction of MOM latency issues in an illustrative embodiment.

Referring to FIG. 4, according to an embodiment, the AI/ML, processing platform 140 uses a logistics regression model to predict whether a latency issue will occur. The logistics regression model utilizes supervised learning to self-tune the model for increased accuracy when predicting whether remedial action needs to be taken. In this case, as can be seen in the block diagram 400, the logistics regression model uses a binary logistics regression algorithm, which utilizes a sigmoid function 475 to generate a binary output indicating whether the analyzed performance metrics 461, 462, 463 and 464 result in a latency issue (Yes 481) or do not result in a latency issue (No 482). In the logistics regression model, the producer performance metrics 461 of, for example, producers 111, the broker performance metrics 462 of, for example, brokers 121, the consumer performance metrics 463 of, for example, consumers 131, and cluster performance metrics 464, are combined using a linear regression (summation) algorithm 470 before the sigmoid function 475 is applied. The cluster performance metrics 464 include performance metrics of a cluster of producers 111, brokers 121 and/or consumers 131, which can be measured by, for example, the infrastructure management component 107. FIG. 5 depicts example pseudocode 500 for leveraging gradient descent and cost function to predict latency in connection with the application of the logistics regression model, and FIG. 6 depicts example pseudocode 600 for using the logistics regression model for classification and prediction of MOM latency issues.

The AI/ML processing platform 140 is assumed to be implemented using at least one processing device. Each such processing device generally comprises at least one processor and an associated memory, and implements one or more functional modules for controlling certain features of AI/ML processing platform 140. The AI/ML processing platform 140 may be provided as a cloud service.

The term "client" or "user" herein is intended to be broadly construed so as to encompass numerous arrangements of human, hardware, software or firmware entities, as well as combinations of such entities. Performance issue prediction services may be provided for users utilizing one or more machine learning models, although it is to be appreciated that other types of infrastructure arrangements could be used. At least a portion of the available services and functionalities provided by the AI/ML processing platform 140 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

The elements of the information processing system 100, including the streaming and event management infrastructure 105 and the components thereof, the infrastructure management component 107, the AI/ML processing platform 140 and the historical database 150, are assumed to be connected to each other at least one network. The network is assumed to comprise a portion of a global computer network such as the Internet, although other types of networks can be part of the network, including a wide area network (WAN), a local area network (LAN), a satellite network, a telephone or cable network, a cellular network, a wireless network such as a WiFi or WiMAX network, or various portions or combinations of these and other types of networks. The network in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The historical database 150 in some embodiments is implemented using one or more storage systems or devices associated with streaming and event management infrastructure 105, the infrastructure management component 107 and/or the AI/ML processing platform 140. In some embodiments, one or more of the storage systems utilized to implement the historical database 150 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the AI/ML processing platform 140, the training and model generation component 141, the data analytics and prediction component 142, the result and alert generation component 143 and/or the remediation component 144 in other embodiments can be implemented at least in part externally to the AI/ML processing platform 140, for example, as stand-alone servers, sets of servers or other types of system coupled to the network 104. For example, the training and model generation component 141, the data analytics and prediction component 142, the result and alert generation component 143 and/or the remediation component 144 may be provided as cloud services accessible by the AI/ML processing platform 140.

The training and model generation component 141, the data analytics and prediction component 142, the result and alert generation component 143 and/or the remediation component 144 in the FIG. 1 embodiment are each assumed to be implemented using at least one processing device. Each such processing device generally comprises at least one processor and an associated memory, and implements one or more functional modules for controlling certain features of the training and model generation component 141, the data analytics and prediction component 142, the result and alert generation component 143 and/or the remediation component 144.

At least portions of the AI/ML processing platform 140 and the components thereof may be implemented at least in part in the form of software that is stored in memory and executed by a processor. The AI/ML processing platform 140 and the components thereof comprise further hardware and software required for running the AI/ML processing platform 140, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the training and model generation component 141, the data analytics and prediction component 142, the result and alert generation component 143 and/or the remediation component 144 in the present embodiment are shown as part of the AI/ML processing platform 140, at least a portion of the training and model generation component 141, the data analytics and prediction component 142, the result and alert generation component 143 and/or the remediation component 144 of the AI/ML processing platform 140 in other embodiments may be implemented on one or more other processing platforms that are accessible to the AI/ML processing platform 140 over one or more networks. Such components can each be implemented at least in part within another system element or at least in part utilizing one or more stand-alone components coupled to the network.

It is assumed that the AI/ML processing platform 140 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the training and model generation component 141, the data analytics and prediction component 142, the result and alert generation component 143 and/or the remediation component 144 of the AI/ML processing platform 140, and the elements thereof can each be implemented in the form of one or more LXCs running on one or more VMs. Other arrangements of one or more processing devices of a processing platform can be used to implement the training and model generation component 141, the data analytics and prediction component 142, the result and alert generation component 143, the remediation component 144, as well as other components of the AI/ML processing platform 140. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the AI/ML processing platform 140 to reside in different data centers. Numerous other distributed implementations of the AI/ML, processing platform 140 are possible.

Accordingly, one or each of the training and model generation component 141, the data analytics and prediction component 142, the result and alert generation component 143, the remediation component 144 and other components of the AI/ML processing platform 140 can each be implemented in a distributed manner so as to comprise a plurality of distributed components implemented on respective ones of a plurality of compute nodes of the AI/ML processing platform 140.

It is to be appreciated that these and other features of illustrative embodiments are presented by way of example only, and should not be construed as limiting in any way.

Accordingly, different numbers, types and arrangements of system components such the training and model generation component 141, the data analytics and prediction component 142, the result and alert generation component 143, the remediation component 144 and other components of the AI/ML processing platform 140, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the AI/ML processing platform 140 can be offered to cloud infrastructure customers or other users as part of FaaS, CaaS and/or PaaS offerings.

Figure 7:
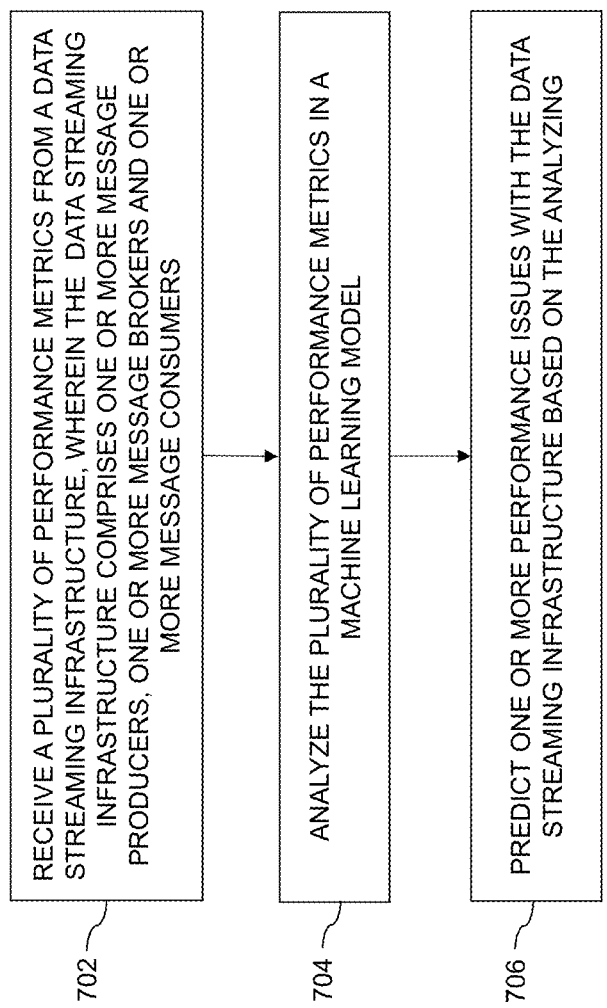
FIG. 7 is a flow diagram of a process for predicting performance of a streaming and event management infrastructure in an illustrative embodiment.

The operation of the information processing system 100 will now be described in further detail with reference to the flow diagram of FIG. 7. With reference to FIG. 7, a process 700 for predicting performance of a streaming and event management infrastructure as shown includes steps 702 through 706, and is suitable for use in the system 100 but is more generally applicable to other types of information processing systems comprising an AI/ML processing platform configured for predicting performance of a streaming and event management infrastructure.

In step 702, a plurality of performance metrics are received from a data streaming infrastructure (e.g. streaming and event management infrastructure 105). The data streaming infrastructure comprises one or more message producers, one or more message brokers and one or more message consumers. In step 704, the plurality of performance metrics are analyzed in a machine learning model, and in step 706, one or more performance issues with the data streaming infrastructure are predicted based on the analyzing.

According to an embodiment, the performance issues comprise one or more latencies associated with one or more nodes of the data streaming infrastructure exceeding a threshold, wherein the process may further include identifying one or more replacement nodes, and substituting the one or more nodes associated with the one or more latencies exceeding the threshold with the one or more replacement nodes.

In using a random forest machine learning model to predict the one or more performance issues, the AI/ML processing platform 140 identifies a plurality of latencies associated with one or more nodes of the data streaming infrastructure, and divides the plurality of latencies into a plurality of bins based on latency duration. A plurality of classes (e.g., low latency, medium latency and high latency) are defined based on bin value. The AI/ML processing platform 140 identifies one or more bins of the plurality of bins belonging to a class of the plurality of the classes exceeding a threshold bin value. In this case, the AI/ML processing platform 140 identifies a given node of the one or more nodes corresponding to a bin belonging the class exceeding the threshold bin value, identifies a replacement node, and substitutes the given node with the replacement node.

It is to be appreciated that the FIG. 7 process and other features and functionality described above can be adapted for use with other types of information systems configured to execute performance issue prediction services on an AI/ML processing platform or other type of processing platform.

The particular processing operations and other system functionality described in conjunction with the flow diagram of FIG. 7 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 7 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with an AI/ML processing platform as disclosed herein can provide a number of significant advantages relative to conventional arrangements. For example, one or more embodiments are configured to predict latency issues for event management and streaming platforms associated with multiple MOM providers running different protocols.

The embodiments provide the capability of using machine learning techniques to analyze a wide range of performance metrics from message producers, message brokers and message consumers to predict anomalies before they occur and impact an enterprise.

The embodiments advantageously provide a simulation framework with generic code and various machine learning algorithms, which can be implemented to predict MOM performance issues with high accuracy, such as latency issues. The embodiments improve operational efficiency around event driven and streaming architectures. Unlike former approaches, the embodiments are able to detect and prevent issues based on real-time data in operational messaging networks before the issues occur.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the AWL processing platform 140 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and an AI/ML processing platform in illustrative embodiments. These and other cloud-based systems in illustrative embodiments can include object stores.

Illustrative embodiments of processing platforms will now be described in greater detail with reference to FIGS. 8 and 9. Although described in the context of system 100, these platforms may also be used to implement at least portions of other information processing systems in other embodiments.

Figure 8:
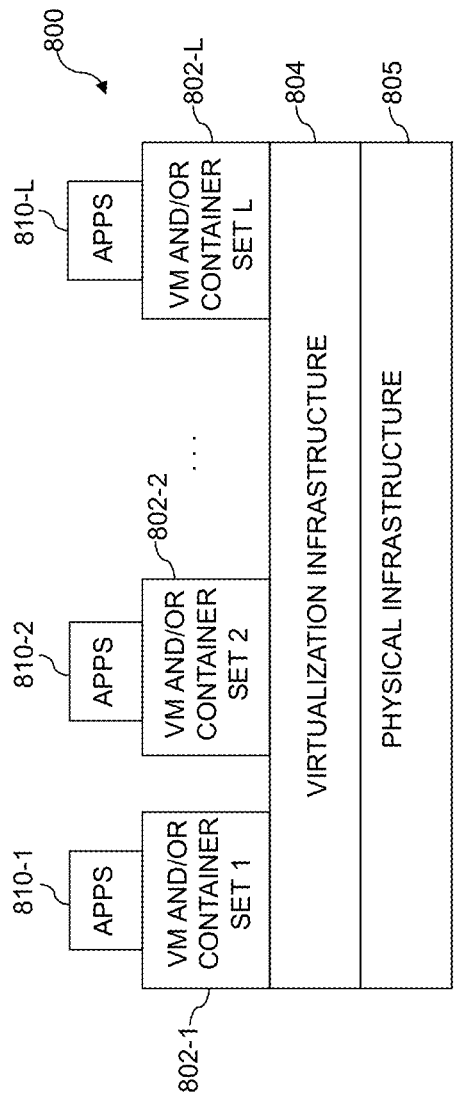

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912. The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the AI/ML processing platform 140 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and AI/ML processing platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising a plurality of processing devices;
   said at least one processing platform being configured:
   to receive a plurality of performance metrics from a data streaming infrastructure, wherein the data streaming infrastructure comprises one or more message producers, one or more message brokers and one or more message consumers;
   to analyze the plurality of performance metrics in one or more machine learning models; and
   to predict one or more performance issues with the data streaming infrastructure based on the analyzing;
   wherein in analyzing the plurality of performance metrics in the one or more machine learning models, said at least one processing platform is configured:
   to analyze at least a portion of the plurality of performance metrics by (i) combining performance metrics from the one or more message producers, the one or more message brokers and the one or more message consumers; and (ii) applying a logistics regression algorithm to a result of the combining to determine whether at least the portion of the plurality of performance metrics results in a performance issue; and
   to generate an output based at least in part on the application of the logistics regression algorithm to the result of the combining, the output indicating one of an existence and an absence of a latency issue.

2. The apparatus of claim 1 wherein the latency issue comprises one or more latencies associated with one or more nodes of the data streaming infrastructure exceeding a threshold.

3. The apparatus of claim 2 wherein said at least one processing platform is further configured:
   to identify one or more replacement nodes; and
   to substitute the one or more nodes associated with the one or more latencies exceeding the threshold with the one or more replacement nodes.

4. The apparatus of claim 1 wherein, in predicting the one or more performance issues, said at least one processing platform is configured:
   to identify a plurality of latencies associated with one or more nodes of the data streaming infrastructure; and
   to divide the plurality of latencies into a plurality of bins based on latency duration.

5. The apparatus of claim 4 wherein, in predicting the one or more performance issues, said at least one processing platform is further configured to at least one of:
define a plurality of classes based on bin value; and
identify one or more bins of the plurality of bins belonging to a class of the plurality of the classes exceeding a threshold bin value.

6. The apparatus of claim 5 wherein said at least one processing platform is further configured:
to identify a given node of the one or more nodes corresponding to a bin belonging the class exceeding the threshold bin value;
to identify a replacement node; and
to substitute the given node with the replacement node.

7. The apparatus of claim 1 wherein the plurality of performance metrics comprise at least one of a response rate, a request rate, a request latency rate, an outgoing byte rate and an average input/output wait time of the one or more message producers.

8. The apparatus of claim 1 wherein the plurality of performance metrics comprise at least one of a page cache reads ratio, disk usage, central processing unit usage, network bytes sent and network bytes received of the one or more message brokers.

9. The apparatus of claim 1 wherein the plurality of performance metrics comprise at least one of a delay between reading and writing of a message, a message consumption rate and a message retrieval rate of the one or more message consumers.

10. The apparatus of claim 1 wherein the plurality of performance metrics comprise at least one of an average latency of one or more servers, a number of queued requests in the one or more servers, a number of follower servers, a number of pending synchronizations for the follower servers, and a number of open files.

11. The apparatus of claim 1 wherein said at least one processing platform is further configured to train the one or more machine learning models based on training datasets comprising historical performance issues of the data streaming infrastructure and one or more performance metrics corresponding to the historical performance issues.

12. The apparatus of claim 1 wherein the plurality of performance metrics are received from the data streaming infrastructure in real-time upon monitoring at least one of the one or more message producers, the one or more message brokers and the one or more message consumers to obtain the plurality of performance metrics.

13. The apparatus of claim 1 wherein said at least one processing platform is further configured to generate and transmit a message to one or more users corresponding to the one or more performance issues.

14. The apparatus of claim 1 wherein the one or more machine learning models comprise at least one of a random forest model, a queueing network model, a time series model, a logistics regression model, a support vector machine and a neural network.

15. A method comprising:
receiving a plurality of performance metrics from a data streaming infrastructure, wherein the data streaming infrastructure comprises one or more message producers, one or more message brokers and one or more message consumers;
analyzing the plurality of performance metrics in one or more machine learning models; and
predicting one or more performance issues with the data streaming infrastructure based on the analyzing;
wherein analyzing the plurality of performance metrics in the one or more machine learning models comprises:
analyzing at least a portion of the plurality of performance metrics by (i) combining performance metrics from the one or more message producers, the one or more message brokers and the one or more message consumers; and (ii) applying a logistics regression algorithm to a result of the combining to determine whether at least the portion of the plurality of performance metrics results in a performance issue; and
generating an output based at least in part on the application of the logistics regression algorithm to the result of the combining, the output indicating one of an existence and an absence of a latency issue; and
wherein the method is performed by at least one processing platform comprising at least one processing device comprising a processor coupled to a memory.

16. The method of claim 15 wherein the latency issue comprises one or more latencies associated with one or more nodes of the data streaming infrastructure exceeding a threshold.

17. The method of claim 16 further comprising:
identifying one or more replacement nodes; and
substituting the one or more nodes associated with the one or more latencies exceeding the threshold with the one or more replacement nodes.

18. A computer program product comprising a non-transitory processor-readable storage medium having stored therein program code of one or more software programs, wherein the program code when executed by at least one processing platform comprising at least one processing device, causes said at least one processing platform:
to receive a plurality of performance metrics from a data streaming infrastructure, wherein the data streaming infrastructure comprises one or more message producers, one or more message brokers and one or more message consumers;
to analyze the plurality of performance metrics in one or more machine learning models; and
to predict one or more performance issues with the data streaming infrastructure based on the analyzing;
wherein in analyzing the plurality of performance metrics in the one or more machine learning models, the program code causes said at least one processing platform:
to analyze at least a portion of the plurality of performance metrics by (i) combining performance metrics from the one or more message producers, the one or more message brokers and the one or more message consumers; and (ii) applying a logistics regression algorithm to a result of the combining to determine whether at least the portion of the plurality of performance metrics results in a performance issue; and
to generate an output based at least in part on the application of the logistics regression algorithm to the result of the combining, the output indicating one of an existence and an absence of a latency issue.

19. The computer program product according to claim 18 wherein latency issue comprises one or more latencies associated with one or more nodes of the data streaming infrastructure exceeding a threshold.

* * * * *